United States Patent [19]
Babinsky et al.

[11] Patent Number: 5,316,622
[45] Date of Patent: May 31, 1994

[54] EMBOSSED OR DIMPLED COMBINED BOARD

[76] Inventors: Vladislav A. Babinsky, 440 Viola Rd., Apt. 19, Spring Valley, N.Y. 10977; Warren G. Mumford, 24 Willis Ave., Cornwall-On-Hudson, N.Y. 12520

[21] Appl. No.: 914,088

[22] Filed: Jul. 16, 1992

[51] Int. Cl.⁵ .............................................. B31F 1/07
[52] U.S. Cl. ........................... 162/109; 162/117; 162/204; 162/205; 162/206; 162/362
[58] Field of Search ............... 162/109, 115, 117, 204, 162/205, 362, 206

[56] References Cited

U.S. PATENT DOCUMENTS

| | | | |
|---|---|---|---|
| Re. 24,361 | 9/1957 | Brown | 162/117 |
| 304,418 | 9/1884 | Fletcher | 162/117 |
| 646,289 | 3/1900 | Jones | 162/117 |
| 735,335 | 8/1903 | Bird | 428/178 |
| 770,293 | 9/1904 | Kendrick | 428/180 |
| 818,500 | 4/1906 | Wilkinson | 162/109 |
| 999,951 | 8/1911 | Bird | 428/178 |
| 1,969,938 | 8/1934 | Mosher | 156/183 |
| 1,983,464 | 12/1934 | Kitchen | 18/47.5 |
| 1,995,057 | 3/1935 | Ellis | 428/601 |
| 2,036,051 | 3/1936 | Kieffer | 428/180 |
| 2,173,797 | 9/1939 | Toohey | 428/180 |
| 2,809,908 | 10/1957 | French | 428/178 |
| 3,026,231 | 3/1962 | Chavannes | 428/178 |
| 3,061,505 | 10/1962 | Helasti | 162/109 |
| 3,208,898 | 9/1965 | Chavannes | 428/178 |

Primary Examiner—Peter Chin

[57] ABSTRACT

A method and apparatus for making an embossed or dimpled combined board is disclosed. The combined board has two outer or facing layers or webs of paperboard which sandwich an embossed or dimpled middle paperboard layer or web. The middle web is embossed by passing it over two apertured vacuum drums. Embossments extending in one direction are vacuum formed on one surface of the middle web by the first vacuum drum, while embossments extending in the opposite direction are formed on the other surface of the middle web by the second vacuum drum. The embossments, i.e., concave and convex impressions, are located in a generally chess board pattern. The vacuum openings or apertures of the second drum are larger (larger average diameter) than those of the first drum, to thereby compensate for diminishing flexibility of the middle web due to drying as it passes sequentially over the first and second vacuum drums. This vacuum opening size difference permits the formation of embossments of equal height on both surfaces of the middle web. Preferably each of the three webs are fed directly from a paperboard making apparatus and the combined board formed prior to final drying of the webs. Alternatively, the middle web may be wetted if already fully or partially dried prior to forming the embossments. While being deformed by the vacuum drums, an external source of heat or radiation, such as steam, hot air, infrared lamps, or the like, may be directed to the web such that the web is concurrently dried as it is being deformed to form the embossments or dimples.

16 Claims, 3 Drawing Sheets

EMBOSSED OR DIMPLED COMBINED BOARD

BACKGROUND OF THE INVENTION

This invention relates to a method and apparatus for the formation of a laminate web of indefinite length, the laminate characterized by two outer or facing paperboard webs which are adhered to and sandwich a middle embossed or dimpled paperboard web. Such laminates are useful for making paperboard boxes.

It is known to form a three layer combined board or three layer laminate from two outer or facing layers and an inner undulating or corrugated layer. Sometimes the inner layer is corrugated and assumes the general form of a sine wave, or assumes the form of dimples, with the dimples either extending outwardly from one side only of the middle layer, or outwardly from both sides. However, the formation of such a combined board or laminate having embossments or dimples extending on both sides is difficult to carry out. A basic manufacturing problem is that of drying of the middle layer as it is being deformed, i.e., as the dimples or corrugations are formed. In the case of vacuum drum deformation, wherein one or more vacuum drums having apertures on their respective surfaces would be employed, the drying of the paperboard as it is being deformed into the drum apertures would present a problem, namely, the lack of desired flexibility and ductility of the paperboard to thereby permit deformation into dimples or embossments having the same height. This problem would become more accentuated wherein one vacuum drum was used to provide dimples or embossments on one surface of the web, while a second vacuum drum was used to form embossments on the other surface. During the formation of the first group or set of embossments, the paperboard would be dried out by the passage of air through it, due to the vacuum formation process, i.e., the porous character of the paperboard. By the time the paperboard reached the second vacuum drum, the paperboard would be significantly dried and is hence even less flexible and thereby more difficult to deform and hence more apt to tear or rip.

SUMMARY OF THE INVENTION

According to the practice of this invention, an embossed or dimpled combined paperboard is formed having the usual two smooth, outer facing layers. The middle layer is formed by passing one surface thereof over an annular portion of a first vacuum drum having a plurality of vacuum apertures or openings over its circumferential side. This causes the paperboard web, after leaving the first vacuum drum, to have embossments or dimples extending from one surface thereof. This same paperboard web is now passed to a second vacuum drum also having a plurality of vacuum apertures over its circumference, and the process repeated. In order to compensate for less flexibility of the paperboard by the time it reaches the second vacuum drum due to drying, the vacuum openings on the second vacuum drum are made larger than those of the first. This permits the less flexible paperboard web, after it leaves the first vacuum drum, to undergo the desired amount of deformation, to obtain embossments of equal height, without tearing or ripping of the second embossments formed by the second vacuum drum and which extend from the other surface of the middle layer or web. Thereafter, the three layer laminate is formed as by conventionally gluing the two facing webs onto the tops of the dimples on respective sides of the middle, embossed paperboard web or layer.

The invention may be carried out by wetting an already dried or partially dried paperboard web which is to form the middle layer and then passing it to the two vacuum rolls having different size vacuum openings, after which it is formed to a three-layer laminate. Preferably however, the method of this invention is carried out by feeding all three of the webs which are to form the three layer combined board directly from the respective paperboard making apparatus which forms the respective individual webs. In this manner, the completed product is formed prior to final web drying, thus obviating the requirement for wetting or re-wetting the middle layer prior to its deformation on the two vacuum drums. Alternatively, the middle layer may be fed to the vacuum drums directly from a paperboard making apparatus, before final drying, while the two facing layers fed from rolls of already dried or partially dried paperboard webs. The middle layer undergoes more deformation than the facing layers, hence it should be as flexible or ductile as possible.

Although not the preferred method of carrying out the invention, the vacuum openings in both vacuum drums may be of the same size, i.e., of the same average diameter. Such an arrangement may be employed when fabricating embossed paperboard from relatively thin webs which are able to withstand relatively greater deformation without tearing than more common paperboard webs of greater thickness when forming the second set of embossments.

DETAILED DESCRIPTION OF THE INVENTION

Figure 1:
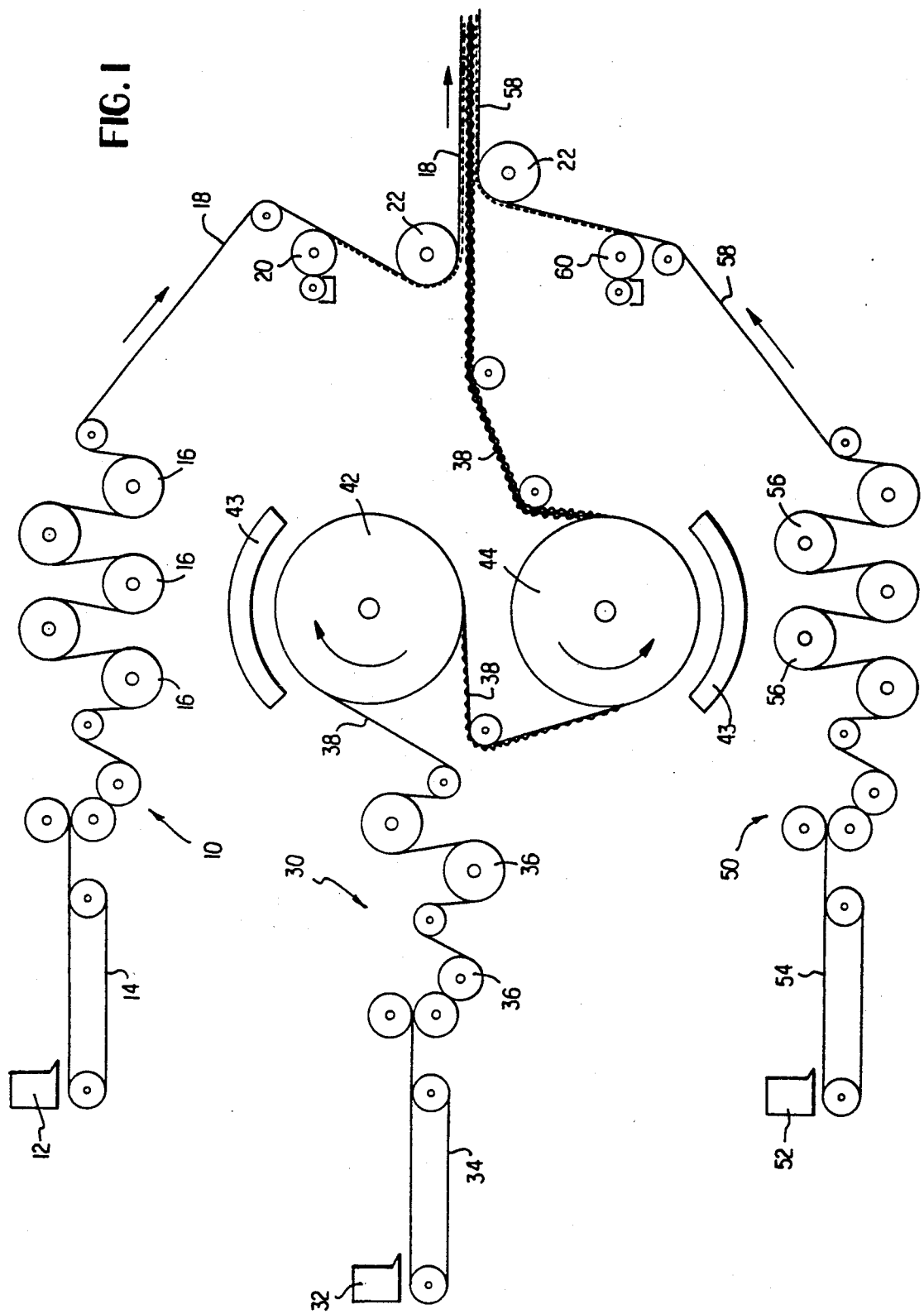
FIG. 1 is a schematic view illustrating a complete installation for carrying out the invention in its preferred form, and shows three distinct paperboard making machines or apparatus for forming each of the three webs required to make the final combined board product.

Referring now to FIG. 1 of the drawings, an installation for carrying out the present invention is schematically illustrated. The numeral 10 denotes a first paperboard manufacturing apparatus for producing a web of paperboard of indefinite length. The numeral 12 schematically designates a conventional head box, with numeral 14 schematically designating the conventional Fourdrinier belt or wire, with 16 denoting conventional rollers, which may include rollers such as drying rollers, and other conventional apparatus downstream of the head box and belt, all for producing a paperboard web 18 of indefinite length. It will be understood that any particular paperboard making apparatus 10 may be employed. Web 18 will form one of the two facing webs of the finished product, the latter to be described. An adhesive applying station or apparatus is schematically designated by 20 for affixing glue to the inner surface of web 18. From this station, web 18 passes over a conventional roller or roller assembly 22 for pressing web 18 onto the middle web of the three layer board.

Again referring to FIG. 1, the numeral 30 denotes a second paperboard web making apparatus or machine which also typically includes a head box 32 and Fourdrinier wire 34. Numeral 36 denotes conventional downstream roll or drum web treating means of the second apparatus 30, which may include drying and other rollers, all for producing a paperboard web of indefinite length. One surface of web 38 is passed over a first rotating vacuum cylinder or drum 42 having a plurality of vacuum openings or apertures on its circumferential surface. After leaving the first vacuum drum 42, web 38 (now provided with embossments or dimples extending substantially normally from one surface thereof) is passed to a second rotating vacuum drum 44 also having a plurality of vacuum openings on its surface. Vacuum drum 44 produces embossments or dimples on the other side of web 38, also extending substantially normally from web 36. The vacuum openings of drum 44 are larger in average diameter than those of drum 42. The vacuum openings on drums 42 and 44 and the drums are so arranged that the second vacuum drum produces embossments only between the embossments made by the first drum, i.e., a chessboard pattern is formed. Heating elements 43 are located contiguous to the web contacting surfaces of vacuum drums 42 and 44, and may consist of infrared lamps, hot air or steam producing devices, dielectric heaters, or other conventional heating means, the exact nature and construction of which are not material to the invention. Such heating of the web as the embossments are being formed enhances the strength of the embossments. Any conventional mechanism (not shown) for providing coordination of the rotation of the two drums may be used. Typically, the centers of the two drums are 8–30 feet apart. The time taken for web 38 to exit from the first drum and initially contact the second drum is typically between 0.2–0.5 seconds, Prior to contacting first drum 42, web 38 typically contains 40–60% dry solids. Web 38 is to form the middle layer of the completed combined board of this invention.

A third paperboard making apparatus or machine is designated in FIG. 1 as 50, and includes, typically, a head box 52 and Fourdrinier wire 54, together with conventional downstream elements 56, which may include drying and other rolls, for forming the second outer or facing paperboard web 58. An adhesive applying apparatus or rotation is schematically designated as 60 and applies glue to the inner surface of web 58. The lower facing web 38 is also applied at station 22.

Facer webs 18 and 58 are dried to a dryness of about 80–90 percent by a respective web contacting means 16 and 56, while web 38 is dried by means 36 to about 50 percent dryness.

Figure 2:
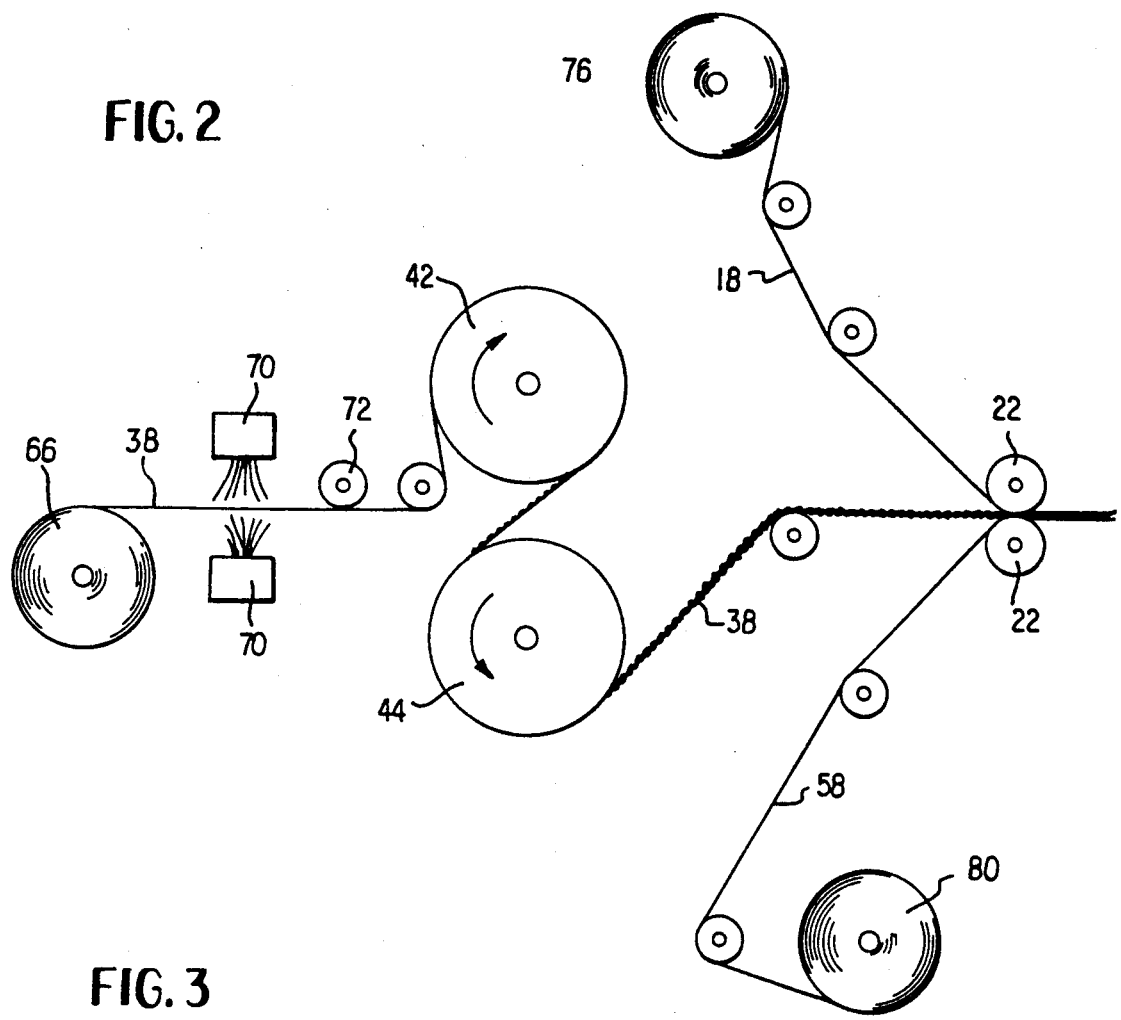
FIG. 2 is a view similar to FIG. 1, but illustrates the formation of the combined board of this invention from paperboard webs which have already been dried.

Referring now to FIG. 2 of the drawings, an apparatus or installation for forming the product of this invention is illustrated wherein the three paperboard webs are fed from already dried or partially dried webs of paperboard wound on rolls. A roll of dried paperboard is indicated schematically as 66, with middle layer 38 of the paperboard being unwound therefrom. Wetting or spray stations are schematically designated as 70 to impart added moisture to the dried paperboard. Feeding mechanisms which may include drying rollers are schematically designated as 72 to feed middle paperboard web 38 to first vacuum cylinder 42 from whence it unwinds and is then fed to second vacuum cylinder 44, these being the same rotating, apertured vacuum cylinders or drums as partially schematically indicated as FIG. 1. Similarly, top or upper paperboard web facing 18 is drawn from a first dried or partially dried web roll 76, while the other facing layer 58 is drawn from dried or partially dried web roll 80, the webs from these rolls also optionally being contacted by conventional rolls. The three webs 18, 38, and 58 are fed to a forming station which includes rotating rolls 22 which were also shown at FIG. 1. At this station, the corrugated or dimpled three layer product of this invention is assembled by conventional apparatus. This method is useful for producing a decorative laminate where strength is not important, the method also employing the above mentioned advantages yielded by the larger vacuum openings on the second vacuum roll.

Figure 3:
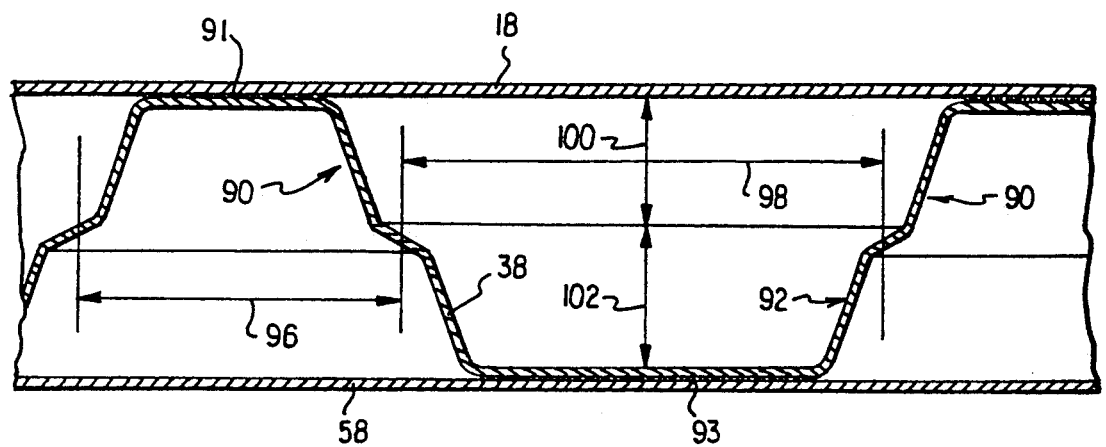
FIG. 3 is a typical longitudinal cross section of the embossed or dimpled combined board of this invention.

Referring now to FIG. 3 of the drawings, a typical longitudinal cross section of the completed, combined paperboard laminate of this invention is illustrated. Again, the top or outer facing web is designated as 18 while the lower web is designated at 58, with the middle layer 38 shown as including a plurality of oppositely directed dimples or embossments. Each of one set of generally conical embossments is designated as 90 and extends upwardly from one surface of web 38, with each of the other set of generally conical embossments denoted as 92 and extending downwardly, from the other surface of web 38. The tips of upper embossments 90 are glued as indicated at 91 to top facing layer 18, with the tips of downwardly extending embossments 92 glued to facer web 58 as indicated by 93. It will be observed that the diameter 96 of embossments 90 is less than the diameter 98 of embossments 92, the latter having been formed by the second rotary vacuum drum 44 of FIGS. 1 and 2. The diameter of the embossments refers to their average base diameter, i.e., where the embossments commence to project from the middle web 38. The height or depth of embossments 90 is designated as 100 while the height or depth of embossments 92 is designated as 102. It will be seen from FIG. 3 that heights 100 and 102 are equal, although they need not be so. The greater diameter 98 of embossments 92, as compared with diameter 96 of embossments 90, is caused by the greater size of the vacuum apertures on second rotating vacuum drum 44 as opposed to the size of the vacuum apertures on first rotating vacuum drum 42. The dimples 90 and 92 are typically arranged, in a plan view of the middle web 38, in a chess board pattern (see FIG. 8).

Figure 4:
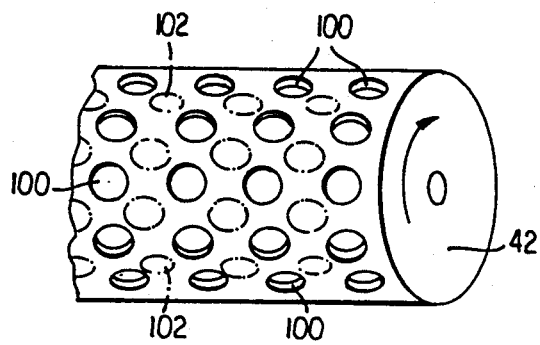
FIG. 4 is a partial schematic view of the first vacuum drum, the drum provided with circular vacuum openings.
Figure 5:
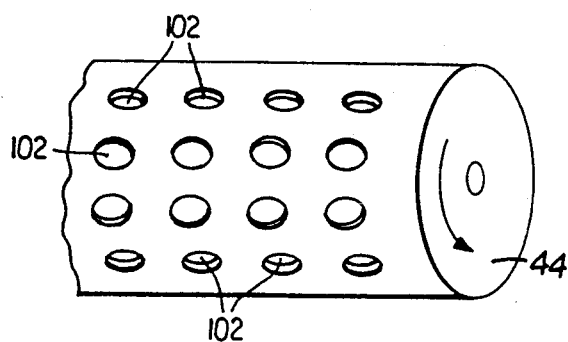
FIG. 5 is a partial schematic view of the second vacuum drum, showing larger circular openings than those of the first vacuum drum.

FIGS. 4 and 5 show the differing diameters between vacuum openings 100 of first drum 44 and (larger) vacuum openings 102 of second drum 44. The dashed circles 102 of FIG. 4 illustrate that openings 102 of drum 44 are staggered with respect to vacuum openings 100 of drum 42 at the nip between these two rolls, so that the embossments of the completely deformed web 38 form a chessboard or checkerboard pattern.

Figure 6:
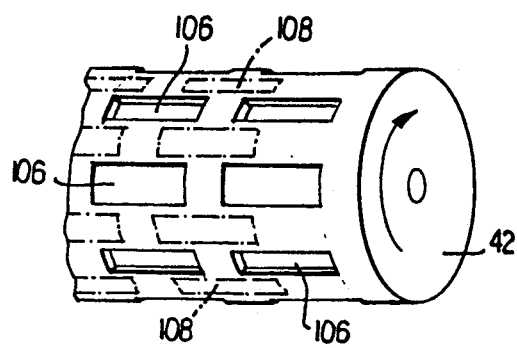
FIG. 6 is a partial schematic view of the first vacuum drum, according to a modification, similar to FIG. 4, showing elongated, rectangular vacuum openings in the first vacuum drum, as opposed to circular openings.
Figure 7:
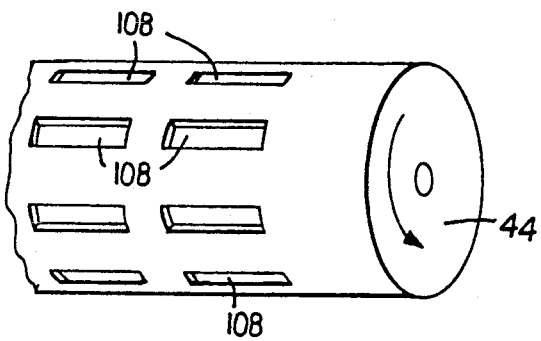
FIG. 7 is a partial schematic view of the second vacuum drum, according to a modification, showing larger elongated, rectangular vacuum openings than those of the first vacuum drum.

FIG. 6 shows first vacuum drum 42 provided with elongated, rectangular vacuum openings 106, which are smaller than vacuum openings 108 on second drum 44 of FIG. 7. Either the width or the length or both of slots 106 is smaller than that of slots 108. Slots 10 may also extend the entire length of the vacuum drums. In the latter case, the shape of web 38 after passing around both vacuum drums will approximate that of a sine wave such as that of a conventional middle liner corrugated layer produced by passing a web through the nip of two gear wheel like drums or cylinders. It will be understood that the peripheral shape of the openings in the two vacuum drums may also be triangular, square, ellipsoidal, or of any desired form. Further, the embossments 90 on one surface of web 38 may be of a different shape than those 92 on the opposite surface of web 38 (again see FIG. 8). For example, the vacuum openings in the first vacuum drum 42 may be round such as those shown at FIG. 4 by 100, while the larger vacuum openings in the second drum 44 may be rectangular, such as those shown in FIG. 7 and denoted as 108. The dashed rectangles 108 of FIG. 6 show their staggering with respect to openings 106 of drum 42 at the nip between rolls 42 and 44 of FIGS. 6 and 7, so that the embossments of the completely deformed web 38 form a chess board pattern.

Figure 8:
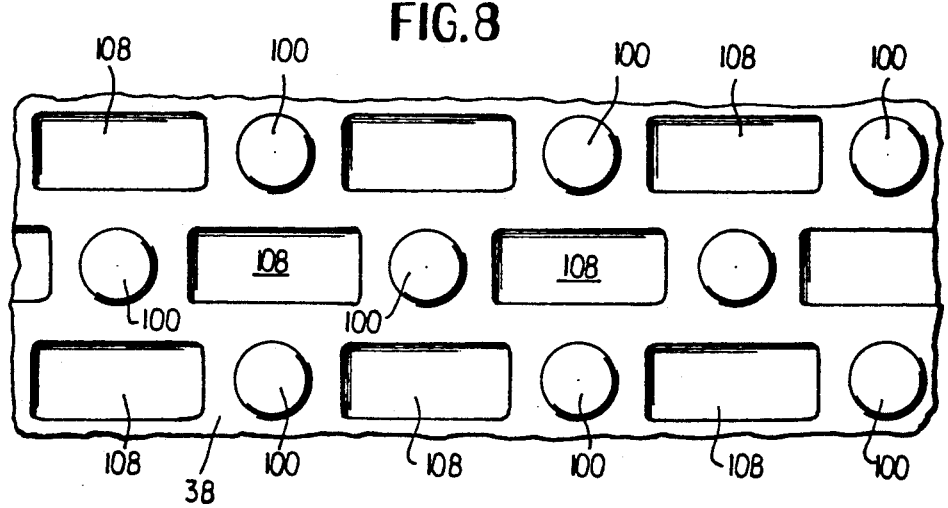
FIG. 8 is a partial plan view of the middle web of the laminate, wherein the middle web has been deformed by vacuum drums having differently shaped vacuum openings on their respective circumferential sides to produce differently shaped embossments

FIG. 8 illustrates the middle web 38 which has been deformed by one vacuum drum having circular openings in its circumferential face, such as drum 42 of FIG. 4, and by another vacuum drum having rectangular openings in its circumferential face, such as drum 44 of FIG. 7. A chess board pattern is maintained, i.e., next adjacent dimples in the rows and columns of deformed web 38 extend in opposite directions. Rectangular embossments 108 extend downwardly, while circular embossments 100 extend upwardly, toward the reader.

Typical vacuum openings on first drum 42 are from 2 to 5 mm in average diameter (size), while vacuum openings on second drum 44 are from 3 to 6 mm in average diameter (size). The thickness of the paperboard webs is typically 0.2 to 0.4 mm. Ambient air temperature is typically up to 600° F., while the vacuum in drums 42 and 44 is typically up to 8 psi (below atmospheric), with drum diameters typically 2 to 10 feet.

While the embossed or middle layer 38 is usually covered on both of its dimpled faces with flat facing webs 18 and 58, the latter secured by respective adhesive areas 91 and 93 to the tips of the embossments or dimples, only one of the facing webs 18 or 58 may be employed to produce an embossed web of only two layers, one being flat and the other being dimpled or embossed.

The invention has been described in connection with forming an embossed paperboard web of indefinite length, since this is the manner in which commercial quantities are produced. However, it will be immediately apparent that selected webs of fixed lengths may be employed using the method disclosed herein.

We claim:

1. A method of making an embossed paperboard web of indefinite length, the method including the steps of, continuously feeding a paperboard web of indefinite length and having two opposite surfaces to a first rotating vacuum drum, said first rotating vacuum drum having a plurality of vacuum openings on its surface, one surface of said paperboard web passing in surface contact with and over a limited annular portion of said first vacuum drum, to thereby form a first set of embossments on one side of said web by said web being partially drawn into said vacuum openings and deformed, feeding the opposite surface of said web, after the web leaves said first drum, to and over a limited angular extent of a second rotating vacuum drum, said second vacuum drum having a plurality of vacuum openings on its surface, to thereby form a second set of embossments on the other side of said web, said openings on said second vacuum drum being larger then said openings on said first vacuum drum, to thereby produce an embossed paperboard web having discrete convex embossments on both surfaces thereof.

2. The method of claim 1 including the additional concurrent steps of continuously adhering a first paperboard facing web portion, from a first paperboard facing web of indefinite length, to the tips of the embossments of a portion of one surface of said embossed web, and continuously adhering a second paperboard facing web portion, from a second paperboard facing web of indefinite length, to the tips of the embossments of a portion of the other surface of said embossed paperboard web, to thereby produce a three layer laminated paperboard.

3. The method of claim 1 wherein said vacuum openings on said drums are annular and wherein the diameter of said annular openings of said second drum is greater than the diameter of said annular openings of said first drum.

4. The method of claim 1 wherein said vacuum openings on said first and second drums are elongated slots and wherein the width of said slots of said second drum is greater than the width of said slots on said first drum.

5. The method of claim 4 wherein said slots of said drums rum substantially transversely of said embossed web.

6. The method of claim 1 wherein said paperboard web which is embossed is fed directly from a paperboard making apparatus prior to final drying of the paperboard web, whereby said embossments are formed prior to final drying of said paperboard web.

7. The method of claim 2 wherein said paperboard web which is embossed is fed directly from a paperboard making apparatus prior to final drying of the paperboard web, whereby said embossments are formed prior to final drying of said embossed paperboard web, and wherein said first and second paperboard facing webs are both fed directly from respective paperboard making apparatus prior to final drying of said paperboard facing webs.

8. The method of claim 1 including the step of heating said web as it passes in surface contact with at least one of said two vacuum drums, whereby said web is embossed and dried during the application of externally supplied heat energy and the strength of the embossments is increased by such concurrent drying and deforming.

9. A method of making an embossed paperboard web of indefinite length, the method including the steps of, continuously feeding a paperboard web of indefinite length and having two opposite surfaces to a first rotating vacuum drum, said first rotating vacuum drum having a plurality of vacuum openings on its surface, one surface of said paperboard web passing in surface contact with and over a limited annular portion of said first vacuum drum, to thereby form a first set of embossments on one side of said web by said web being partially drawn into said vacuum openings and deformed, feeding the opposite surface of said web, after the web leaves said first drum, to and over a limited angular extent of a second rotating vacuum drum, said second vacuum drum having a plurality of vacuum openings on its surface, to thereby form a second set of embossments on the other side of said web to thereby produce an embossed paperboard web having discrete convex embossments on both surfaces thereof.

10. The method of claim 9 including the additional concurrent steps of continuously adhering a first paperboard facing web portion, from a first paperboard facing web of indefinite length, to the tips of the embossments of a portion of one surface of said embossed web, and continuously adhering a second paperboard facing web portion, from a second paperboard facing web of indefinite length, to the tips of the embossments of a portion of the other surface of said embossed paperboard web, to thereby produce a three layer laminated paperboard.

11. The method of claim 9 wherein said vacuum openings on said drums are annular and wherein the diameter of said annular openings of said second drum is greater than the diameter of said annular openings of said first drum.

12. The method of claim 9 wherein said vacuum openings on said first and second drums are elongated slots and wherein the width of said slots of said second drum is greater than the width of said slots on said first drum.

13. The method of claim 9 wherein said slots of said drums rum substantially transversely of said embossed web.

14. The method of claim 9 wherein said paperboard web which is embossed is fed directly from a paperboard making apparatus prior to final drying of the paperboard web, whereby said embossments are formed prior to final drying of said paperboard web.

15. The method of claim 10 wherein said paperboard web which is embossed is fed directly from a paperboard making apparatus prior to final drying of the paperboard web, whereby said embossments are formed prior to final drying of said embossed paperboard web, and wherein said first and second paperboard facing webs are both fed directly from respective paperboard making apparatus prior to final drying of said paperboard facing webs.

16. The method of claim 9 including the step of heating said web as it passes in surface contact with at least one of said two vacuum drums, whereby said web is embossed and dried during the application of externally supplied heat energy and the strength of the embossments is increased by such concurrent drying and deforming.

* * * * *